Patented Aug. 2, 1949

2,477,654

UNITED STATES PATENT OFFICE 2,477,654

CONDENSATES OF ROSIN WITH UNSATURATED ACYCLIC HYDROCARBONS

Alfred L. Rummelsburg, Wilmington, Del., assignor to Hercules Powder Company, Wilmington, Del., a corporation of Delaware No Drawing. Application May 21, 1946, Serial No. 671,391

14 Claims. (Cl. 260—97)

This invention relates to resinous condensation products of rosin with unsaturated acyclic compounds and to esters of said condensation products and to varnish compositions containing them.

Rosin has long been known to be deficient alone or in the form of its esters for use in varnishes, particularly because of its softness and poor bodying characteristics. Polymerization of rosin has been one means practiced by the art to overcome such deficiencies. By polymerization of rosin some improvement has been obtained but products which would be entirely satisfactory from the standpoint of bodying, drying, and flexibility characteristics have not been produced by polymerization alone.

Now in accordance with this invention, it has been found that rosin may be condensed with unsaturated acyclic compounds to form novel resinous condensation products which may be esterified, the condensation products more particularly in the form of their esters exhibiting the desired improvement in bodying, drying, and flexibility characteristics when used in varnishes and other coating compositions.

More particularly, the condensation products of rosin with unsaturated acyclic compounds of this invention are resinous products obtained by condensing a rosin with an unsaturated acyclic compound, which is capable of selfpolymerization to a hemicolloid, with or without a condensation catalyst at temperatures within the range of about −10° C. to about 350° C., depending upon the particular materials being condensed and other factors.

The conditions for effecting the condensation of rosin with the unsaturated acyclic compounds are more specifically set forth in the following examples. Unless otherwise noted all weights are parts by weight.

EXAMPLE 1

To a solution of 100 parts of rosin dissolved in 570 parts ethylene dichloride cooled to −10° C. was added 55 parts liquid butadiene. To this solution while stirring at −12° C. to −5° C. was added boron trifluoride gas over a period of 7 minutes until 2 parts boron trifluoride was absorbed. The reaction mixture was then allowed to stand at room temperature with occasional stirring during which time the temperature increased to 40° C. over a 20-minute period and gradually fell to room temperature. After 4 hours' standing, the solution was washed with water at 50° C. to 60° C. to remove the catalyst and then 200 parts xylene was added to reduce the viscosity during the distillation to remove solvent. The solvents were removed by distillation at 20 to 30 mm. up to a final bath temperature of 210° C. The yield of condensate from which the solvent was removed amounted to 141 parts. From the weight of the condensate it is calculated that 2.3 moles butadiene combined with 1 mole rosin. The product had the following analysis: acid number 98.5, drop melting point 144° C., unsaponifiable 9.3, molecular weight about 550.

In Table I are set forth in examples reaction conditions for the production of some of the other typical condensates of this invention. The rosins used were pale wood rosins.

Table I

| Example | Unsaturated Acyclic Compound | Reactants | | Reaction Conditions | | | | | | Products | | | |
|---|---|---|---|---|---|---|---|---|---|---|---|---|---|
| | | Weight Acyclic Compound | Weight Rosin | Catalyst | Weight Catalyst | Solvent | Weight Solvent | Time, Min. | Temperature, °C. | Weight | Acid Number | Drop Melting Point, °C. | Unsaponifiable Content |
| 1 | Butadiene | 55 | 100 | BF$_3$ | 2 | C$_2$H$_4$Cl$_2$ | 570 | 240 | 30–40 | 141 | 98.5 | 144 | 9.3 |
| 2 | do | 210 | 790 | do | 18 | do | 4,410 | 240 | 43–46 | 895 | 128 | 128 | |
| 3 | do | 550 | 380 | do | 16 | do | 3,040 | 240 | 40 | 858 | 57 | 175 | |
| 4 | do | 47 | 200 | do | 2 | Benzene | 300 | 75 | 50–60 | 246 | 119 | 110 | |
| 5 | do | 75 | 250 | None | | Gasoline | 1,300 | 300 | 200 | 264 | 153 | (²) | 6.3 |
| 6 | Isoprene | 80 | 100 | BF$_3$ | 11 | C$_2$H$_4$Cl$_2$ | 850 | 1,020 | 0–5 | 174 | 82 | 149 | |
| 7 | do | 25 | 250 | do | 5 | Benzene | 375 | 90 | 25–30 | 261 | 150 | 104 | 6.3 |
| 8 | Monovinyl Acetylene | 15 | 100 | do | 2 | Xylene | 180 | 240 | 20–25 | 124 | 121.5 | 139 | 5.4 |
| 9 | Isobutene | 42 | 150 | do | 3 | C$_2$H$_4$Cl$_2$ | 850 | 240 | 45 | 169 | 144.5 | 88 | 8.3 |
| 10 | Butadiene | 210 | 790 | do | 18 | do | 4,490 | 240 | 43–46 | 898 | 122 | 133 | |
| 11 | Ethylene | | 400 | None | | Anh. CH$_3$OH | 300 | 300 | 300 | ¹470 | ¹7.1 | ¹76 | |
| 12 | Butadiene | 50 | 200 | H$_2$SO$_4$ (95%) | 45 | Benzene | 466 | 120 | 10–15 | 225 | 120.5 | 95 | 11.9 |

¹ Methyl ester.
² Softer than Rosin.

The preferred catalyst is boron trifluoride as used in these examples. However, other catalysts may be used, or the condensation may be carried out at elevated temperatures without a catalyst as in the case of Examples 5 and 11. In Example 5 p-tertiary butyl catechol was present to inhibit the spontaneous polymerization of butadiene with itself. In Example 11 the condensation of ethylene with rosin was carried out in anhydrous methanol so that the methyl ester of the rosin-ethylene condensate was obtained directly.

The condensation of ethylene with rosin was carried out by adding ethylene up to a pressure of 1000 lbs./sq. in. at 20° C. to the methanol solution of rosin in a nickel-lined autoclave. The autoclave was rocked during the heating period to effect agitation of the contents. During the heating at 300° C. a pressure drop from 5350 lb./sq. in. to 3550 lb./sq. in. indicated the progress of the condensation. The characteristics of the product set forth in Table I indicate that the product was an ester. The corresponding acidic condensate was obtained by distilling off 384 parts of methyl ester boiling at about 195° C. to 210° C. (1-2 mm. pressure) leaving behind 79 parts residue and saponifying the distillate, extracting unsaponifiable material with ether, and acidifying the ether-washed saponified solution. The acidic rosin-ethylene condensate had the following analysis: acid number 170, saponification number 169-170, drop melting point 87° C., molecular weight (in acetone) 352-353, per cent hydrogen absorption (Pt catalyst) 0.94 (regular N wood rosin 1.44%), combustion analysis 80.01% carbon, 10.25% hydrogen.

The rosins which are used are those containing ethylenic unsaturation, such as the natural rosins of the type of wood and gum rosin, and treated rosins such as heat-bleached, heat-treated, and isomerized rosins.

The unsaturated acyclic compounds used are those capable of selfpolymerization to hemicolloids; i. e., to polymers having at least 20 to 100 units per polymer molecule. Acyclic compounds of this type and suitable for use are compounds having a single center of unsaturation such as ethylene, propylene, and isobutene; and compounds having at least two centers of unsaturation such as butadiene, 2-chlorobutadiene, isoprene, 2,3-dimethyl butadiene, vinyl acetylene, piperylene, 2-methyl pentadiene-1,3, and divinyl acetylene. Mixtures of any of these compounds may be used. The molecular ratio of rosin to unsaturated acyclic compound in the condensation may vary from about 0.1 to 20. Any unreacted unsaturated acyclic compound may be removed from the condensation product, as for example by distillation.

Where a catalyst is desired, any of the well-known condensation catalysts may be used such as the Friedel-Crafts type catalysts including boron trifluoride, complexes of boron trifluoride with ethers and organic acids, halides of metals whose hydroxides are amphoteric, such as aluminum chloride, zinc chloride, stannic chloride, titanium tetrachloride, etc., and mineral acid condensation catalysts such as hydrofluoric acid, fluoroboric acid, sulfuric acid, and phosphoric acid. The Friedel-Crafts type catalysts are preferred.

When a catalyst is used for the condensation, a temperature range varying from as low as —50° C. to as high as 150° C. may be used. Ordinarily temperatures from about 0° C. to about 60° C. are preferred with boron trifluoride catalysts, while with zinc chloride a temperature of about 100° C. to about 140° C. is preferred. When no catalyst is used, a somewhat higher temperature is desirable, as from about 125° C. to about 350° C. and preferably from about 150° C. to about 275° C.

Inert solvents may be used to improve the fluidity of the reactants and to facilitate dispersion of the catalyst. Satisfactory solvents are aromatic solvents such as benzene, xylene, and the like; hydrocarbon solvents such as cyclohexane and benzene hydrocarbons, and halogenated solvents such as carbon tetrachloride and ethylene dichloride. Similar solvents may be used in carrying out the reaction in the absence of a catalyst. The rosin condensates of this invention are stabilized resinous materials having decreased tendency to absorb oxygen. Moreover, they are generally higher melting than rosin and are believed to be true condensates as indicated by the low unsaponifiable content. The preferred products of this invention have an unsaponifiable content not substantially greater and melting points substantially higher than those of the rosins from which they are made. They are characterized by solubility in aromatic, paraffinic, and olefinic hydrocarbon solvents, turpentine, and drying oils. Their solubility in the lower alcohols is in general low, but increases as the molecular weight of the alcohol increases.

The condensation products of rosin with unsaturated acyclic compounds having a single center of unsaturation appear to be high molecular weight monocarboxylic acids containing chiefly only one resin acid nucleus per molecule. These acids may be mixtures of condensation products wherein one or more molecule of unsaturated acyclic compound, for example, is condensed with a single resin acid molecule. The condensation products of rosin with unsaturated acyclic compounds having more than one center of unsaturation in the molecule appear to contain polybasic acids wherein more than one resin acid nucleus has been condensed with the polyunsaturated acyclic compound. Moreover, the condensate appears to be a mixture of monocarboxylic acids and polycarboxylic acids depending upon the conditions used in effecting the condensation. An example of a condensate rich in dibasic acids and the conditions for its preparation are set forth in Table I, Example 3. The preferred condensates of this invention are those having an average molecular weight between about 350 and 1000. The condensation products containing various ratios of resin acid to acyclic compound are prepared by varying the amount of unsaturated acyclic compound added in the condensation and by controlling the rate of condensation.

The esters of the condensation products of rosin with unsaturated acyclic compounds may be prepared by heating with the desired alcohol at temperatures within the range of about 200° C. to about 350° C. with or without catalysts such as zinc and calcium salts.

The method of preparing the esters of the condensation products of rosin with unsaturated acyclic compounds of this invention and the properties of the esters so produced are illustrated by the examples of Table II.

The alcohols which may be used to esterify the condensation products of rosin with the unsaturated acyclic compound are the monohydric alcohols such as methyl alcohol, ethyl alcohol, pro- Table II

| Ester Number | Condensate | Ester Preparation ||||||| Ester Properties |||
|---|---|---|---|---|---|---|---|---|---|---|---|
| | | Example of Table I | Weight Calcium Acetate Catalyst | Weight Condensate | Weight Glycerol | Weight Pentaerythritol | Temperature, °C. | Time, Hrs. | Drop Melting Point, °C. | Viscosity 60% in Xylene | Acid Number |
| 1 | Butadiene-Rosin | 2 | | 600 | 52.7 | | 200–270 | 18 | 159 | 5.25 | 21 |
| 2 | do | 10 | 1.1 | 400 | | 34 | 270–295 | 5 | 169 | | 21 |
| 3 | do | 12 | | 600 | 41.2 | | 200–270 | 14.5 | 175 | | 10.3 | pyl alcohol, etc., and the polyhydric alcohols such as glycol, glycerin, pentaerythritol, dipentaerythritol, sorbitol, mannitol, propylene glycol, polyethylene glycol, trimethylene glycol, and diglycerol. The polyhydric alcohol esters are hard resinous materials having decreased tendency to absorb oxygen and having in general melting points higher than the corresponding rosin esters. If desired, esters may likewise be prepared directly by use of a rosin ester in the condensation reaction. Mixed esters of the condensation products may be produced by esterification in admixture with other acidic materials as drying oil fatty acids.

Varnishes may be produced from the condensation products of this invention or their esters by customary varnishmaking technique with use of any of the well-known drying oils such as linseed oil, tung oil, dehydrated castor oil, soya oil, fish oil, sunflower seed oil, rapeseed oil, perilla oil, oiticica oil, hemp seed oil, and dissolving in a solvent.

A varnish was prepared from the rosin condensate of Example 3, Table I by heating 360 parts linseed oil with 9.3 parts pentaerythritol and 1.8 parts litharge catalyst at 220–270° C. for 6 hours and then heating at 270° C. for 1 hour and 20 minutes with 236 parts of said rosin condensate followed by dilution with mineral spirits. After inclusion of 0.2% lead and 0.03% cobalt as naphthenates (based on solids content) the varnish obtained showed fast drying characteristics together with excellent flexibility and excellent water and alkali resistance.

The compositions of this invention can thus be made into oleoresinous varnishes having bodying characteristics and drying characteristics superior to those prepared from rosin or polymerized rosin and whose varnish films have greater water resistance, flexibility, and stability toward oxidation.

What I claim and desire to protect by Letters Patent is:

1. A new composition of matter comprising a resinous material selected from the group consisting of a condensation product of rosin with an unsaturated acyclic hydrocarbon capable of selfpolymerization to a hemicolloid and aliphatic esters of said condensation product, the molar ratio of rosin to acyclic compound in the condensate being from about 0.1 to 20.

2. A new composition of matter comprising a resinous material selected from the group consisting of a condensation product of rosin with an unsaturated acyclic hydrocarbon having a single center of unsaturation and being capable of selfpolymerization to a hemicolloid and aliphatic esters of said condensation product, the molar ratio of rosin to acyclic compound in the condensate being from about 0.1 to 20.

3. A new composition of matter comprising a resinous material selected from the group consisting of a condensation product of rosin with an unsaturated acyclic hydrocarbon having at least two centers of unsaturation and being capable of selfpolymerization to a hemicolloid and aliphatic esters of said condensation product, the molar ratio of rosin to acylic compound in the condensate being from about 0.1 to 20.

4. A new composition of matter comprising a resinous material selected from the group consisting of a condensation product of rosin with isobutene and aliphatic esters of said condensation product, the molar ratio of rosin to isobutene in the condensate being from about 0.1 to 20.

5. A new composition of matter comprising a resinous material selected from the group consisting of a condensation product of rosin with ethylene and aliphatic esters of said condensation product, the molar ratio of rosin to ethylene in the condensate being from about 0.1 to 20.

6. A new composition of matter comprising a resinous material selected from the group consisting of a condensation product of rosin with butadiene and aliphatic esters of said condensation product, the molar ratio of rosin to butadiene in the condensate being from about 0.1 to 20.

7. A new composition of matter comprising a resinous ester of an aliphatic polyhydric alcohol and a condensation product of rosin with isobutene, the molar ratio of rosin to isobutene in the condensate being from about 0.1 to 20.

8. A new composition of matter comprising a resinous ester of an aliphatic polyhydric alcohol and a condensation product of rosin with ethylene, the molar ratio of rosin to ethylene in the condensate being from about 0.1 to 20.

9. A new composition of matter comprising a resinous ester of an aliphatic polyhydric alcohol and a condensation product of rosin with butadiene, the molar ratio of rosin to butadiene in the condensate being from about 0.1 to 20.

10. The method of producing a stabilized resinous material which comprises condensing rosin with an unsaturated acyclic hydrocarbon capable of selfpolymerization to a hemicolloid, the molar ratio of rosin to acyclic compound being from about 0.1 to 20.

11. The method of producing a stabilized resinous material which comprises condensing rosin with an unsaturated acyclic hydrocarbon having a single center of unsaturation and being capable of selfpolymerization to a hemicolloid, the molar ratio of rosin to acylic compound being from about 0.1 to 20.

12. The method of producing a stabilized resinous material which comprises condensing rosin with an unsaturated acyclic hydrocarbon having at least two centers of unsaturation and being capable of selfpolymerization to a hemicolloid, the molar ratio of rosin to acyclic compound being from about 0.1 to 20.

13. A coating composition comprising a resinous material selected from the group consisting of a condensation product of rosin with an unsaturated acyclic hydrocarbon capable of self-polymerization to a hemicolloid and aliphatic polyhydric alcohol esters of said condensation product the molar ratio of rosin to acyclic compound in the condensate being from about 0.1 to 20; and a volatile petroleum hydrocarbon solvent in an amount which will yield a readily flowing mixture capable of application in a thin film.

14. A coating composition comprising a resinous material selected from the group consisting of a condensation product of rosin with an unsaturated acyclic hydrocarbon capable of self-polymerization to a hemicolloid and aliphatic polyhydric alcohol esters of said condensation product the molar ratio of rosin to acyclic compound in the condensate being from about 0.1 to 20; a drying oil; and a volatile petroleum hydrocarbon solvent in an amount which will yield a readily flowing mixture capable of application in a thin film.

ALFRED L. RUMMELSBURG.

REFERENCES CITED

The following references are of record in the file of this patent:

UNITED STATES PATENTS

| Number | Name | Date |
| --- | --- | --- |
| 1,942,531 | Barrett | Jan. 9, 1934 |
| 1,975,959 | Lawson et al. | Oct. 9, 1934 |
| 2,129,478 | Rohm | Sept. 6, 1938 |
| 2,251,806 | Rust | Aug. 5, 1941 |
| 2,354,776 | Rummelsburg | Aug. 1, 1944 |